April 7, 1936.
T. L. BISSELL
2,036,191
SELF STARTING SIPHON
Filed March 28, 1934
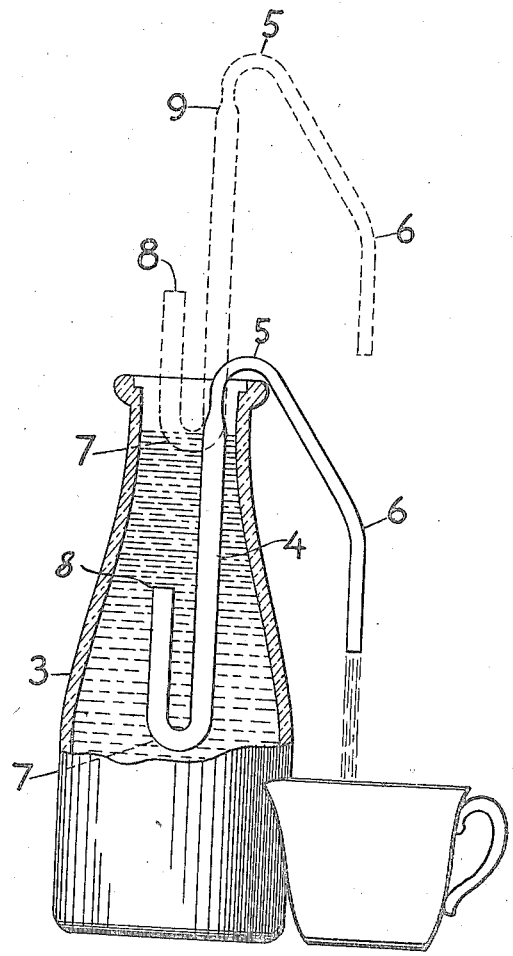
Titus L. Bissell  INVENTOR
BY
*Johnston & Jennings*
ATTORNEY Patented Apr. 7, 1936

2,036,191

UNITED STATES PATENT OFFICE 2,036,191

SELF-STARTING SIPHON

Titus L. Bissell, Birmingham, Ala.

Application March 28, 1934, Serial No. 717,729

2 Claims. (Cl. 137—20)

My invention relates to a self-starting siphon for extracting liquid such as cream from a milk bottle or other vessel.

The object of my invention is to produce an extractor for cream and the like so designed that it will make a novel use of the forces of hydrostatic pressure and inertia of a body of liquid in a bottle or container to set up a siphonic action when the extractor is thrust thereinto without it being necessary to use any piston, plunger or other like working part to mechanically induce the siphonic action.

The chief object of my invention is to avoid in the extractor any working parts which would add to cost and be difficult to clean, and produce a siphon extractor in the form of a tube with its intake end so designed that by thrusting it into service position, the hydrostatic pressure in the body of liquid and the slight additional pressure, due to the inrush of liquid into the intake end, provides two forces acting jointly to lift the liquid level in the siphon tube sufficiently above the liquid level in the bottle or container so as to start the siphonic action. Where a relatively thick substance, such as cream, is to be siphoned from a milk bottle, I find it desirable to contract the intake leg of the siphon tube adjacent to the upper bend, this contraction acting to cause the rising body of cream in the tube by its inertia to rise a little higher than otherwise and thereby to render more certain the starting of the siphonic action.

In the preferred form of my invention, the lower end of its intake leg is provided with a reverse bend which opens upwardly at a level below the upper bend equal to the maximum depth to which liquid is to be extracted from the bottle or vessel. By thrusting this intake leg downwardly into the body of liquid there will occur an inrush of liquid into this upturned end which aided by the hydrostatic pressure in the body of the liquid itself causes the liquid rising in the intake leg to as it were jump or rise higher and which will thus lift it over the upper bend and start the siphonic action.

In the drawing I show a milk bottle with the reverse bend type of siphon extractor being thrust downwardly from its initial dotted position preparatory to producing the siphonic action to its full line position with the siphonic action induced.

Similar reference numerals refer to similar parts throughout the drawing.

In the embodiments of my invention illustrated, I show a milk bottle 3 as a conventional liquid container with which my novel type of siphon may be employed to extract the cream. It will be understood however that the invention has a much wider application than for this particular service.

The siphon shown comprises an intake leg 4 connected by a U-bend 5 with a discharge leg 6, the tubing being preferably of glass though any desired material may be used.

At the lower end of the intake leg I form a reverse bend 7 beyond which the tube rises close to and parallel with the leg 4 and presents its open end 8 at a distance below the upper bend 5, which distance corresponds to the lowest level at which the siphon will work in the bottle.

In use, the operator grasps the siphon at or near its upper U-bend 5, inserts the reverse bend 7 into the neck of the bottle and when its open intake end 8 is about to be submerged the siphon is given a quick down thrust. This quick down thrust brings the open intake end 8 suddenly a substantial distance below the upper level of the liquid and there results an inrush of cream caused both by the static pressure of the body of liquid plus the inertia of the moving column induced by the downward thrust into the bottle. As a result the liquid rushes rapidly in producing what I call a jump effect in the intake leg 4 which lifts it high enough above the level of the liquid in the bottle to cause it to pass over the upper bend 5 and to establish the siphonic action which will continue, unless interrupted by lifting the siphon, until the liquid falls below its open end 8. It will be noted that there is no mechanical action such as a plunger or stopper required to induce this siphonic action and that in starting the quick down thrust to submerge the bend 6 no splashing will be produced.

Where more viscous liquids are to be extracted, it may be desirable to contract the intake leg as at 9, near its upper end to various degrees, this contraction preferably taking place at or approaching the level where the liquid is to pass over the U-bend 5. This contraction converts some of the energy of pressure into motion causing the liquid to jump or move higher in the tube, and thus insuring the establishment of the siphon. It is preferable to use this contraction for extracting cream, placing it approximately the same distance above the intake end 8 as the U-bend 7 drops below said intake end.

While I have shown my invention in its preferred form, it will be obvious to those skilled in the art that it is not so limited, but is susceptible of various other changes and modifications, without departing from the principle thereof, and I desire, therefore, that only such limitations shall be placed thereupon as are imposed by the prior art or as are specifically set forth in the appended claims.

What I claim is:—

1. A siphon extractor, comprising intake and discharge legs connected by a U-bend and having its intake leg contracted near said bend, said intake leg having its intake end bent up to present its open end at a level approximately midway between the bottom of the U-bend and the point of contraction of the intake leg disposed and adapted, responsive to a free downward thrust thereof into the container, to defer the inrush of a column of liquid until it is adapted, by its momentum aided by the head of fluid pressure effective thereon and the contraction of the tube, to be lifted over the U-bend into the discharge leg and start the siphonic action.

2. A siphon extractor for cream and the like, comprising a tube bent at an intermediate point to provide intake and discharge legs, said tube being contracted from a point near the upper end of the intake leg throughout its discharge leg, and said intake leg having a U-bend at a point to present its open end at a level substantially midway between the U-bend and said point of contraction in the tube.

TITUS L. BISSELL.